(12) United States Patent
Kusens et al.

(10) Patent No.: US 9,997,001 B2
(45) Date of Patent: *Jun. 12, 2018

(54) ELECTRONIC ACCESS CONTROL AND LOCATION TRACKING SYSTEM

(71) Applicant: COLLATERAL OPPORTUNITIES, LLC, Wilmington, DE (US)

(72) Inventors: Bruce Howard Kusens, North Miami Beach, FL (US); Michael Kusens, Cooper City, FL (US)

(73) Assignee: COLLATERAL OPPORTUNITIES, LLC, Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/818,020

(22) Filed: Nov. 20, 2017

(65) Prior Publication Data

US 2018/0096550 A1 Apr. 5, 2018

Related U.S. Application Data

(63) Continuation of application No. 15/627,820, filed on Jun. 20, 2017, now Pat. No. 9,858,741, which is a (Continued)

(51) Int. Cl.
*G07C 9/00* (2006.01)
*H04W 4/02* (2018.01)
(Continued)

(52) U.S. Cl.
CPC ... *G07C 9/00309* (2013.01); *G06F 17/30867* (2013.01); *G07C 9/00103* (2013.01); *G07C 9/00111* (2013.01); *G07C 9/00571* (2013.01); *G07C 9/00817* (2013.01); *H04W 4/02* (2013.01); *H04W 64/00* (2013.01); *G07C 2009/00388* (2013.01); *G07C 2009/00769* (2013.01); *G07C 2209/02* (2013.01)

(58) Field of Classification Search
CPC ...... G07C 9/00309; G07C 2009/00769; G07C 9/00111; G07C 9/00007; G07C 9/00571; G07C 2009/00793
USPC ....................................................... 340/5.61
See application file for complete search history.

(56) References Cited

U.S. PATENT DOCUMENTS 7,600,679 B2 * 10/2009 Kshirsagar .......... G07C 9/00111
235/375
8,446,249 B2 * 5/2013 Gerstenkorn .......... G08C 19/00
340/5.2

* cited by examiner

*Primary Examiner* — Mark Blouin
(74) *Attorney, Agent, or Firm* — Daniel S. Polley, P.A.

(57) ABSTRACT

A method and system that allows authorized individuals access into controlled access locations and the ability to grant temporary and limited access to guests into these locations. The method and system allows for navigational services to be provided to members and guests, and real-time tracking and confirmation to members and administrators that guests have arrived at their destination and did not enter any unauthorized areas. The method preferably can work through a system of wireless radio, sound and/or light-based beacons communicating with member and guest's electronic devices. Members and administrators can send one or more temporary electronic access keys to a guest's smartphone or other electronic device. Wireless radio, sound and/or light-based beacons provide an access control and location tracking system with real-time data about the member and guest whereabouts, allowing for the confirmation and tracking.

29 Claims, 8 Drawing Sheets

Registration of Member Device

Related U.S. Application Data continuation of application No. 15/286,753, filed on Oct. 6, 2016, now Pat. No. 9,691,206, which is a continuation of application No. 15/055,477, filed on Feb. 26, 2016, now Pat. No. 9,466,163, which is a continuation of application No. 14/827,222, filed on Aug. 14, 2015, now Pat. No. 9,424,699.

(60) Provisional application No. 62/037,684, filed on Aug. 15, 2014.

(51) Int. Cl.
*H04W 64/00* (2009.01)
*G06F 17/30* (2006.01)

FIGURE 1: Registration of Member Device
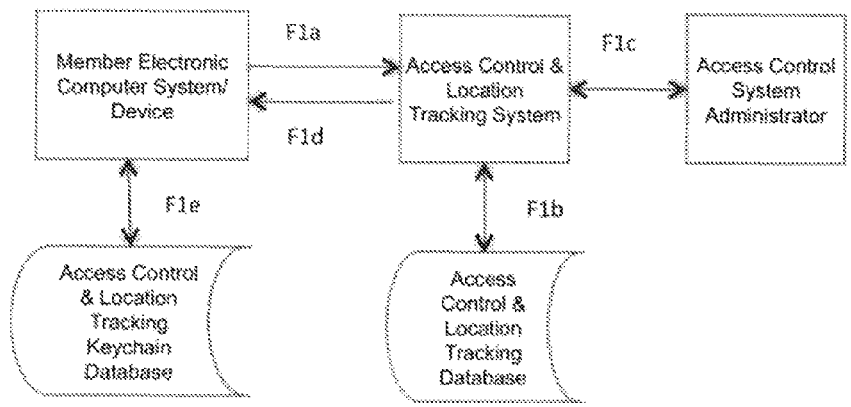
FIGURE 2: Sending Access Key to Guest Device
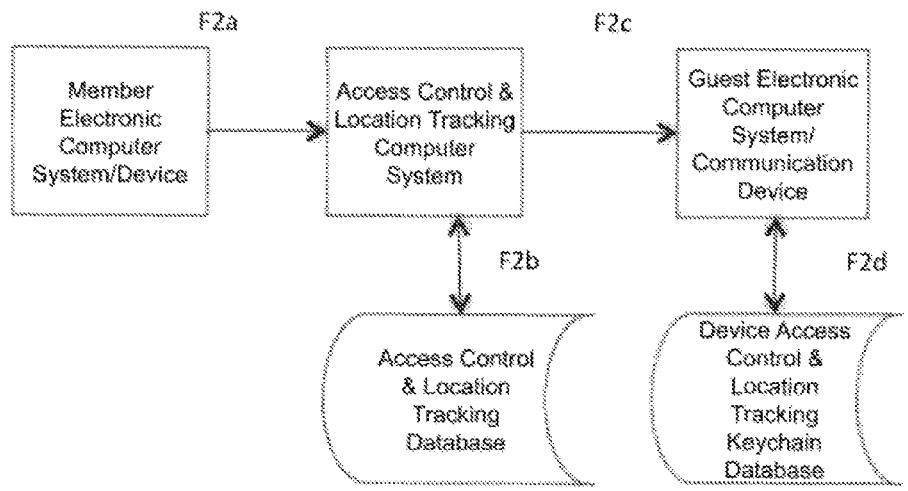

FIGURE 3: Determination of Access Rights
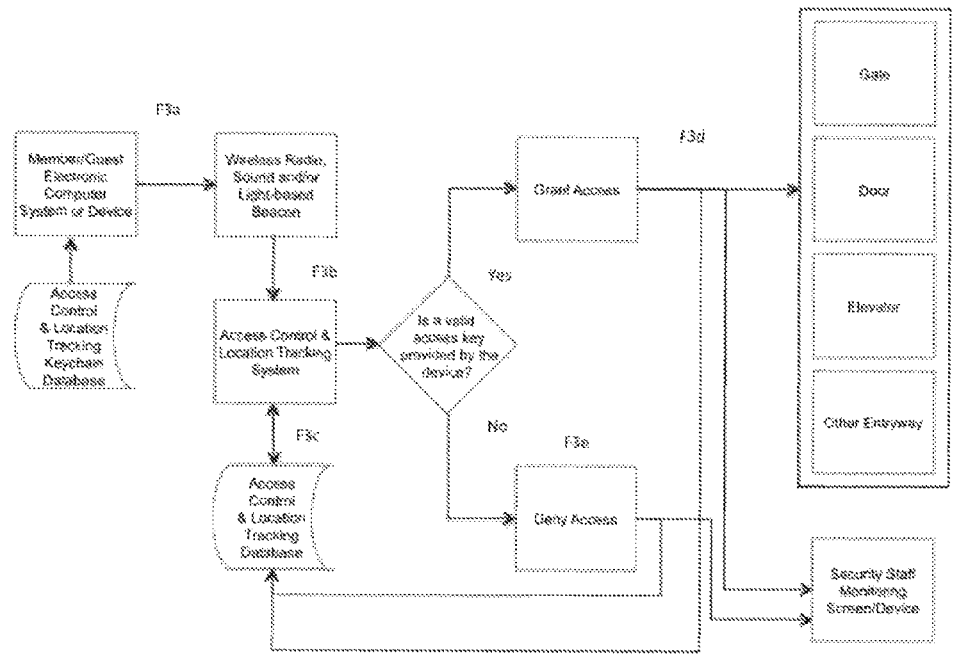
FIGURE 4: Determination of Authorized Location(s)
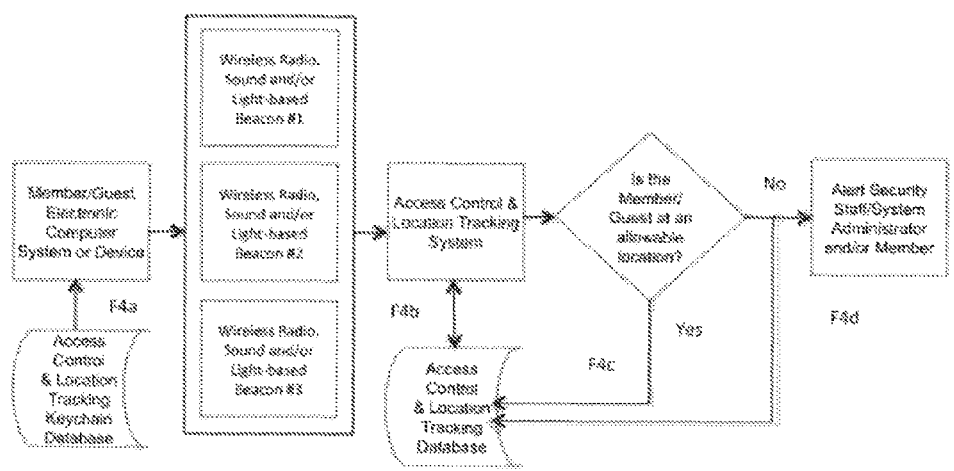

FIGURE 5: Determination of Arrival at Authorized Location(s)
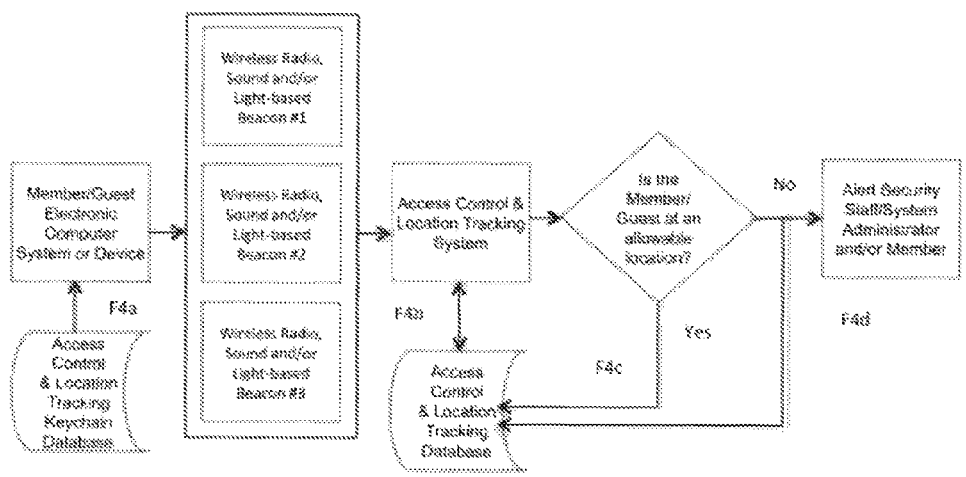
FIGURE 6: Determination of Location and Navigational Support
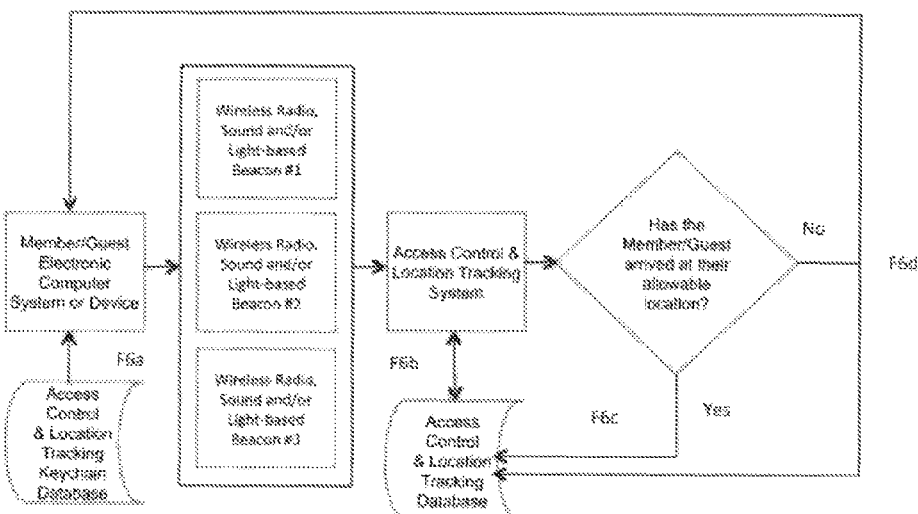

FIGURE 7: Access Control & Notification Rules Engine
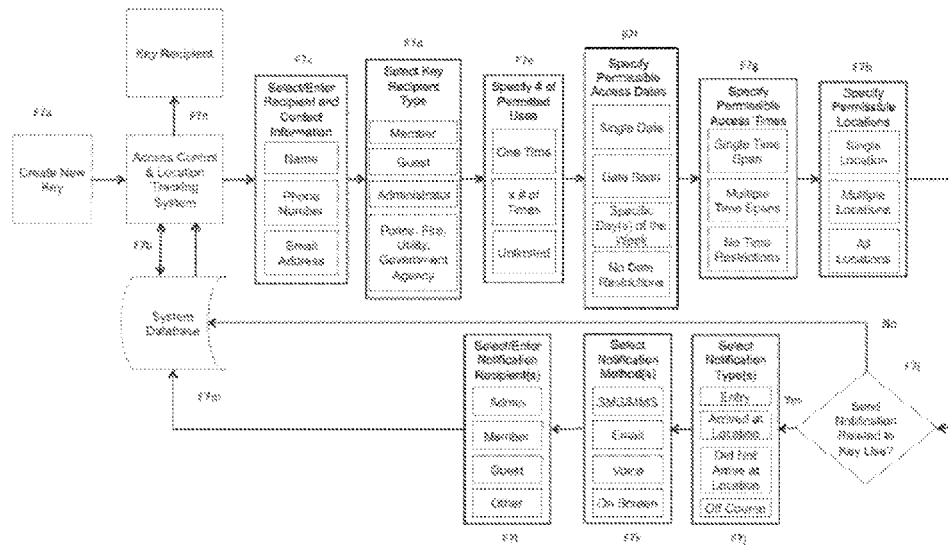
FIGURE 8: Storage of Keys in Keychain Database
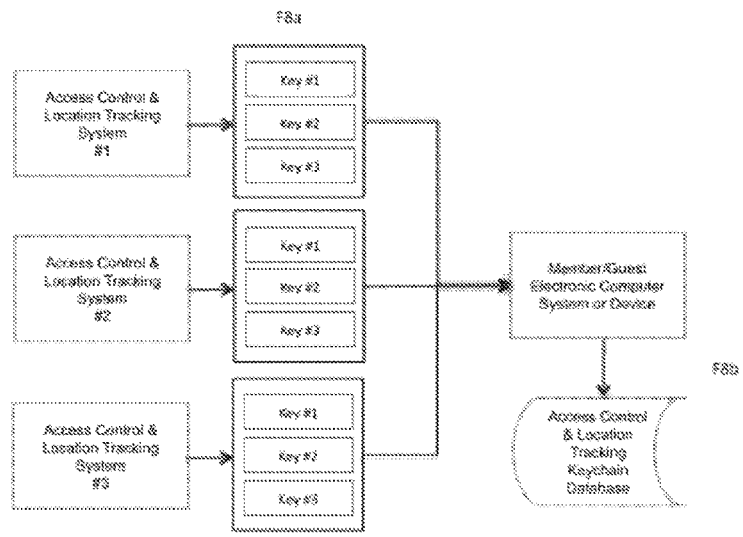

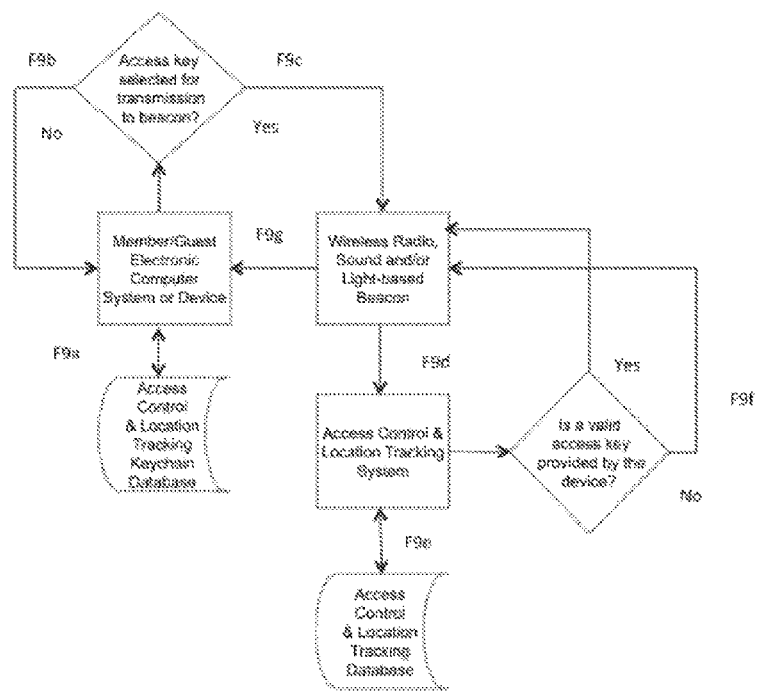
FIGURE 9: Manually Sending Keys from Device to Access Control & Location Tracking System

FIGURE 10: Auto-Prompting to Select a Key and Manual Key Selection to Send from Device to Access Control & Location Tracking System
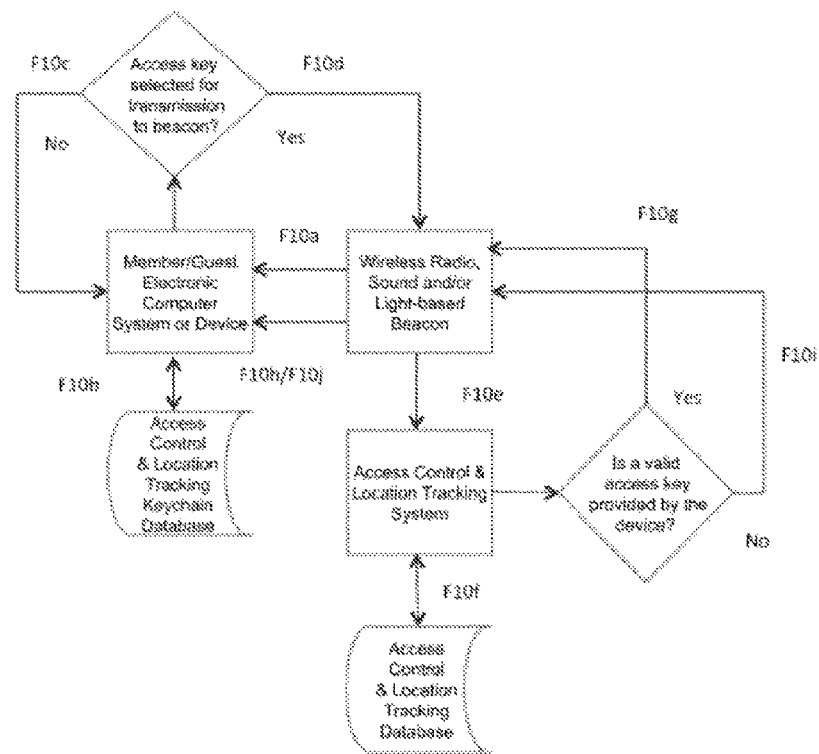

FIGURE 11: Auto-Prompting & Key Selection to Send from Device to Access Control & Location Tracking System
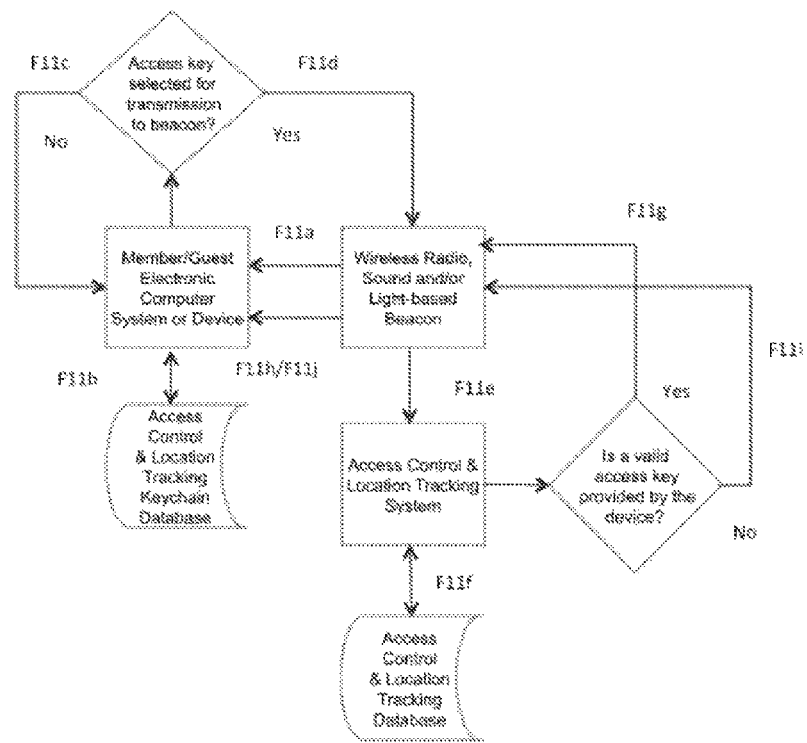
FIGURE 12: Process for a Guest to Request a Key from a Member
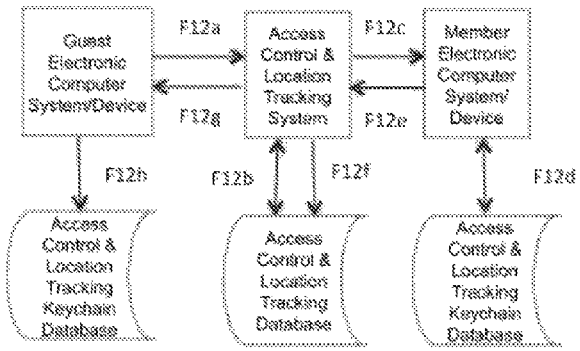

US 9,997,001 B2

ELECTRONIC ACCESS CONTROL AND LOCATION TRACKING SYSTEM

This application is a continuation of U.S. application Ser. No. 15/627,820, filed Jun. 20, 2017, which is a continuation of U.S. application Ser. No. 15/286,753, filed Oct. 6, 2016, now U.S. Pat. No. 9,691,206, which is a continuation of U.S. application Ser. No. 15/055,477, filed Feb. 26, 2016, now U.S. Pat. No. 9,466,163, which is a continuation-in-part of U.S. application Ser. No. 14/827,222, filed Aug. 14, 2015, now U.S. Pat. No. 9,424,699, which claims priority to and the benefit of U.S. Application Ser. No. 62/037,684, filed Aug. 15, 2014. All applications are incorporated by reference in their entireties for all purposes.

BACKGROUND

Controlled access areas have become increasingly commonplace in modern society. From hospitals to gated communities, sensitive industries to prison complexes, there is a need to control the flow of human capital. Systems for doing so are often rudimentary, such as those that utilize a guard who checks an individual's identification and access rights. Other systems involve physical keycards and passes, which allow access past static checkpoints.

These systems are often insufficient for controlling and tracking the movement of guests who have access for a particular, limited purpose. Once past a static checkpoint, control systems have limited means for tracking a guest's movements. Furthermore, guests may become lost or enter into areas beyond the scope of their invitation.

It is to addressing or reducing these problems that the current disclosure is directed.

SUMMARY OF THE DISCLOSURE

A method and system are described that allows members (as defined below), system administrators or other authorized individuals access into to controlled access locations; as well as the ability for members and administrators to grant temporary and limited access to guests into these locations. Additionally, the method and system allows for navigational services to be provided to members and guests, and real-time tracking and confirmation to members and administrators that guests have arrived at their destination and did not enter any unauthorized areas.

The disclosed method preferably can work through a system of wireless radio, sound and/or light-based beacons communicating with member and guest's smartphones, computer systems, or other electronic devices. Members and administrators can send one or more temporary electronic access keys to a guest's smartphone or other electronic device. Wireless radio, sound and/or light-based beacons provide an access control & location tracking system with real-time data about the member and guest whereabouts, allowing for the confirmation and tracking described above and below. Depending on the type of location using the system, in certain circumstances one or more members, in addition to guests, also may not have access to all restricted areas at the given location. As a non-limiting example, where the system is used by a condominium ("condo") building and a particular condo owner is delinquent on their Condo Association fees, access to community areas (i.e. exercise rooms, club house, etc.) for the particular condo owner could be restricted, but not the entrance, elevators or garage. As another non-limiting example, commercial buildings may allow a tenant to access the building entrance, elevator for their particular floor and garage, but not other floors of the building.

The following definitions are provided for a better understanding of the disclosure:

| | |
|---|---|
| Access Control & Location Tracking Database | The electronic database where permissions and locations of guests and members are managed and stored. |
| Access Control & Location Tracking System | The specially programmed computer/electronic system which monitors guest and member authorizations and locations based on information received from and being in communication with wireless Radio, Sound and/or Light-based Beacons to monitor activity in controlled access areas. |
| Member/Guest Electronic Computer System or Device | A specially programmed computer system or electronic device including, but not limited to, cell phone, smartphone, key card, tablet, laptop or other computer system belonging to a member, guest, administrator or public service personnel. |
| Access Control & Location Tracking Keychain Database | An electronic database that stores digital access keys sent to a specific member, guest, administrator or public service personnel's device. The keychain database can store digital keys from one or more different access control & location tracking systems and is preferably stored on the member/guest's electronic device which stores the particular member's or guest's keys. This allows the system to be used at multiple locations via a single electronic device app. The other above defined database (Access Control & Location Tracking Database) is preferably provided at each location of installation for the system and stores the keys, member/guest information and access rights for the particular installation of the system. |
| Administrator | A person responsible for the determining who is authorized to enter into a controlled access area. |
| Authorized Persons | Persons who have permission to enter a controlled access area. |
| Wireless Radio, Sound and/or Light-based Beacon | A small receiver/transmitter capable of operating on short and/or long range wireless communication between electronic devices. Capabilities include but are not limited to pinpointing its own location, utilizing the software in a smart phone, cellular phone or other electronic device to determine that device's location and bi-directional data transmission. Wireless radio, sound and/or light-based beacons can utilize technologies including, but not limited to, Near Field Communication (NFC), Bluetooth, WiFi, Light-Fidelity (LiFi), Ultrasound, InfraRed (IR), and Radio Frequency (RF). All of these technologies and similar |

| | |
|---|---|
| | current or similar later developed communication technologies are included in the term "wireless radio" wherever that term appears in this disclosure. |
| Checkpoint | A pre-determined location within a controlled access area where the Access Control & Location Tracking system is programmed to determine whether a member or guest has the necessary credentials to proceed further. |
| Controlled Access Area Or Controlled Access Location | Locations where the general public may not enter without permission from a member or administrator. (e.g. sensitive areas in hospitals, gated communities, prisons, private areas of businesses, apartment buildings). |
| Device | A smartphone, cellular phone, computer, tablet, laptop or any electronic device with wireless radio, sound and/or Light-based Beacon capability and specifically programmed with the below defined "Permissions Application". |
| Guest | An individual with temporary, limited access into all or part of a controlled access area. |
| Key | An electronic or digital code, which is stored in the permissions application. This code is checked against the access control & location tracking database to determine whether a member or guest has permission to be in a controlled access area at a given date and time. |
| Member | An individual with permission to be in a controlled access location, and authority to grant guests access to a controlled access location. |
| Permissions Application | A software based application which retains the permissions for entry into controlled access locations. This application can be run on a smartphone, computer, tablet, or other electronic device. |

BRIEF DESCRIPTION OF THE DRAWINGS

FIG. 1 is a block diagram of certain non-limiting components of the disclosed access control and location tracking system and also illustrating the steps/communications generally involved in the registration of a member device;

FIG. 2 is a block diagram of certain non-limiting components of the access control and location tracking system and also illustrating the steps/communications generally involved in sending an access key to a guest device;

FIG. 3 is a block diagram of certain non-limiting components of the access control and location tracking system and also illustrating the steps/communications generally involved in determining access rights;

FIG. 4 is a block diagram of certain non-limiting components of the access control and location tracking system and also illustrating the steps/communications generally involved in determining authorized locations;

FIG. 5 is a block diagram of certain non-limiting components of the access control and location tracking system and also illustrating the steps/communications generally involved in determining arrival at authorized locations;

FIG. 6 is a block diagram of certain non-limiting components of the access control and location tracking system and also illustrating the steps/communications generally involved in determining location and navigational support;

FIG. 7 is a block diagram and process flow for access control and the notification rules engines for the disclosed access control and location tracking system;

FIG. 8 is block diagram and process flow for the storage of electronic keys in the keychain database in connection with the disclosed access control and location tracking system;

FIG. 9 is a block diagram of certain non-limiting components of the access control and location tracking system and also illustrating the steps/communications generally involved in sending electronic keys from an electronic device to the access control and location tracking system;

FIG. 10 is a block diagram of certain non-limiting components of the access control and location tracking system and also illustrating the steps/communications generally involved in auto-prompting for selecting an electronic key for sending from an electronic device to the access control and location tracking system;

FIG. 11 is a block diagram of certain non-limiting components of the access control and location tracking system and also illustrating the steps/communications generally involved in auto-prompting and electronic key selection for sending from an electronic device to the access control and location tracking system;

FIG. 12 is a block diagram of certain non-limiting components of the access control and location tracking system and also illustrating the steps/communications generally involved in a guest requesting an electronic key from a member in connection with the access control and location tracking system;

DETAILED DESCRIPTION

Figure 13:
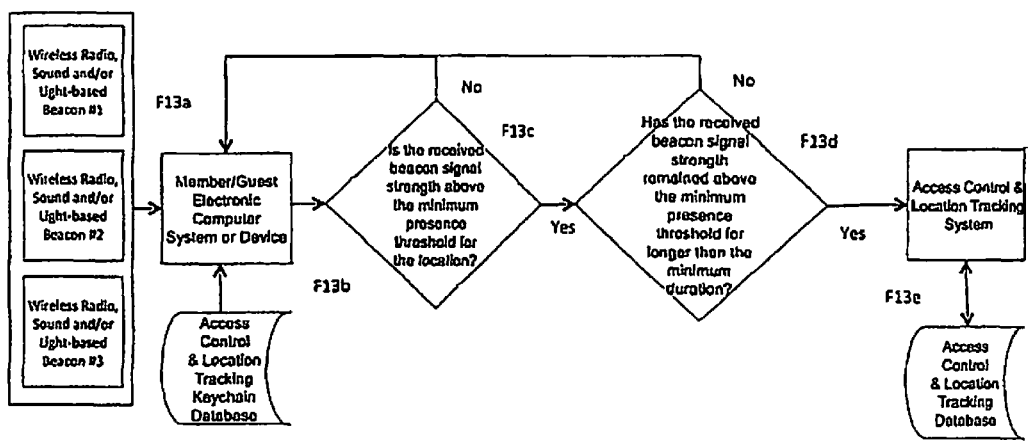
FIG. 13 is a block diagram of certain non-limiting components for determining presence at a specific location and also illustrating the steps/communications generally involved in selecting the appropriate digital key for the specific location.

FIG. 1 shows one method for allowing a member to register their computer system or electronic device with the disclosed access control & location tracking system. This initial registration process preferably allows a member to electronically receive digital/electronic access keys as well as grant a guest access to a controlled access location, and subsequently track the guest's location within that area.

At step F1a, a member registers their electronic computer system or electronic device with the disclosed access control & location tracking system. This enables the member to use their computer system or electronic device to access restricted locations and provide their guests with temporary access to controlled access areas. It also allows the member to use their electronic device to track their guest's location within the controlled access area, and confirm their guest's arrival and departure at a given permitted location. Registration can be accomplished in a number of non-limiting ways. As one non-limiting example, the system administrator can register the members directly through the programmed software using a form and then have the members credentials sent to the member via SMS, MMS, Email, Voice, Mail or other delivery methods. Alternatively, the member can download the software application (app) to their electronic device, register through a form on the app and then the system administrator can approve or deny the registration request. Once the software app is installed on the electronic device and registration is accepted by the system administrator the members digital/electronic keys can be downloaded by the member to the electronic device and stored in their electronic keychain database on their electronic device. The application/database storing the digital/electronic keys then transmits the key to the Access Control & Location Tracking System via any of the wireless radio, light or sound based technologies (wifi, Bluetooth, lifi, rfid, etc.)

At step F1b, the access control & location tracking system is programmed to record permissions afforded to and requested by members and retains and electronically stores those permissions in the Access Control and Tracking Location database. The system utilizes this database's record of members, guests, access rights, locations, and permissions to determine and then grant the level of access to a member, a guest requested by a member, and to provide the real time tracking and confirmation of member and guest movements.

At step F1c, the access control system administrator oversees the access control & location tracking system. Through the system, the administrator can track all member and guest movements, rights, and access. This allows the administrator to employ the necessary level of security or emergency response to protect the safety of members and guests, should a member or guest go beyond the scope of their access. The administrator is notified of the device registration request and can grant or revoke permission to use the registered device. Though not limiting, in the preferred embodiment, the system can be programmed such that the administrator receives device registration requests from a member. The system can also be programmed such that guest registration requests go directly to the member they are requesting access from (though the system can also be programmed to permit the administrator to override, approve and/or cancel decisions made by the member concerning the guest's request).

At step F1d, the access control & location tracking system electronically sends the member's electronic computer system or electronic device the digital access key assigned to them. It also provides the member's electronic computer system or electronic device with real time information on their guest's or other associated/authorized member's whereabouts. This allows the member to confirm that the guest reached their destination.

At step F1e, the digital access key is stored in the electronic keychain database on the member's electronic computer system/device. A similar keychain database on a guest's electronic device is created to store any digital access key(s) granted to a guest through the system.

FIG. 2 illustrates how a member provides a guest access to the controlled access location. The member electronically sends the guest a digital electronic key, which provides the guest with access to a controlled access area limited by the parameters set by the member.

At step F2a, a member electronically sends a request to the access control computer system that a digital key be generated and electronically sent to a guest. The member enters any limitations to be placed on the guest's access to the controlled area in the request. An administrator can also be permitted to enter additional access restrictions for the guest. In one non-limiting embodiment, the system can be programmed to provide a form containing a series of checkboxes for each location controlled by the system that the member can select from. A date and time module can also be provided for allowing the member to indicate the starting date and time and ending date and time for the guest's digital key. Further detail on the permissions and limitations a member can place on a key for a guest is discussed in connection with FIG. 7.

At step F2b, the access control and location computer system records the member's request and automatically enters it into the access control database. This information is electronically stored and later used by the Access Control & Location Tracking system when the guest receives their access key and enters the secured access location.

At step F2c, the access control and location computer system can directly send the guest an electronic key to their smartphone or other electronic device via electronic communication methods including but not limited to direct data connection, SMS, Email, MMS and voice. A confirmation electronic message can be sent to the member to inform them that their guest's key was approved and sent to the guest. Alternatively, the system can be programmed that the guest key is first sent to the member, and the member forwards it to the guest. The key is imported to a software application, which is stored locally on the guest's device. This application acts as an electronic keychain of access keys. In one non-limiting embodiment, the digital key can be an electronic file, which is preferably encrypted. The key can be auto-imported where it is sent to person's electronic device through an app directly that is downloaded on the electronic device or manually added if the key is sent through SMS or email. For the manual method, the guest can click on the file and than have an app import the key to the local device database. Once the guest receives the key, the guest has all access rights, which have been granted to them by a member, as seen/discussed in step F2a and FIG. 7. The guest can have a key provided by multiple members within the same Access Control & Location Tracking System location or keys for multiple locations (with separate instances of the Access Control & Location Tracking System). As a non-limiting example, if the guest is a service provider (i.e. plumber, electrician, personal trainer, delivery person, etc.) the guest may need to have keys from multiple members at any given time. Also in some instances a person can be a member at one location and a guest at other locations and may have member key(s) and guest(s) keys on his or her electronic keychain database stored on his or her electronic device.

At step F2d, the electronic key is electronically stored in the access control & location tracking keychain database on the guest's device.

FIG. 3 illustrates how the system grants or denies access to a member or guest based on the electronic key on their device.

At step F3a, the member or guest attempting to enter a controlled access location will have an electronic key on their device, such as the electronic key the guest receives from the steps described in FIG. 2. Through a wireless radio, sound and/or light enabled application, their device will retrieve all electronic keys stored in the device's keychain database and transmit them to any wireless radio, sound and/or light-based beacons in an immediate proximity to the controlled access area entrance. FIG. 9 shows one non-limiting embodiment where the electronic device can be configured for its owner to manually select the digital key to transmit (i.e. virtual clicker), while FIG. 10 shows another non-limiting embodiment where the electronic device can be configured to auto-sense that it is at a beacon and then have the user manually select the digital key to transmit to the beacon and FIG. 11 shows a further non-limiting embodiment where the electronic device can be configured to automatically sense that it is at a beacon and then automatically send the digital key(s) to the beacon. The member or guest can also choose which specific key to transmit if so configured and desired. The key can be manually chosen via a user interface provided by the software installed on the member's or guest's electronic device or it can also just send all keys available on the users keychain to the system and it will continue to check each key on the keychain to see if one grants them access for the location, date and time. The system can be programmed such that access denial is only given after all available keys are checked. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software, accesses the radios and other communication hardware available on the electronic device and uses them as needed.

At step F3*b*, the member or guest's device will communicate through wireless radio, sound and/or light-based beacons with the access control and location tracking system. The system will then recognize that a device with the application is in proximity to a controlled access area and retrieve the key(s) stored on said device. As mentioned above, the software can be configured to automatically send the keys or the member/guest can choose which key to send. When the software on the member/guest's electronic device is in range of a beacon, it can receive a signal triggering it to send the keys in its keychain database to the access control & location tracking database.

At step F3*c*, the access control & location tracking system automatically searches though the access control & location tracking database for permissions granted to the member or guest from the provided key. The member or guest will be permitted to enter areas based on these permissions.

At step F3*d*, when a member or guest wishes to enter into a controlled access area, the system will determine whether the member or guest has a valid key allowing entry. If a valid key is presented, access is granted and an electronic signal is sent to open the access barrier such as a Gate, Door, Elevator or other Entryway. Additionally, notification is electronically sent to Security Staff through a computer screen or other electronic device. The access control & location tracking database is updated with details pertaining to the access event such as the key code, date, time and location.

At step F3*e*, if a valid key is not presented, then access will be denied and notification is sent to Security Staff through a computer screen or other electronic device. The access control & location tracking database is updated with details pertaining to attempted access event including the key code, date, time and location. Optionally, the Access Control and Location Tracking system can be programmed that where a guest or member attempts to enter an area where they are not approved (i.e. when access denied by the system), all of some of the access permissions that they have been granted are suspended or terminated, to permit the administrator or other proper personnel (i.e. security) to investigate the denial (i.e. determine whether it was an accident or that the member/guest has bad motives). The results of the investigation can determine whether the previous permissions are granted again or unsuspended by the system.

FIG. 4 demonstrates how the system determines whether a member or guest is in an authorized or unauthorized location on a continuous basis.

At step F4*a*, physical wireless radio, sound and/or light-based beacons are placed throughout a controlled access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and transmitted by the wireless radio, sound and/or light-based beacons to the access control & location tracking system preferably in continuous intervals.

At step F4*b*, the access control & location tracking system receives the access key(s) and compares the key(s) to the access control & location tracking database to determine the permissions afforded to each specific key that is received.

At step F4*c*, if the member or guest is in an authorized location based on the permissions retrieved in F4*b*, then the system will update the database to reflect the current location of the member or guest.

At step F4*d*. If the member or guest is in an unauthorized location, then the system administrator and/or security staff is notified. In the case of a guest, the member who granted the guest access can be notified as well that the guest has gone beyond the parameters of their authorization. The alert is generated by the access control & location tracking system and can be sent through computer, voice, email, IM, SMS, MMS, pager or other communication method. The access control & location tracking database can also be updated with the member or guests current location. Additionally, the termination or suspension of all or some of the guest/member's access permissions as described above can also be performed by the Access Control & Location Tracking system.

FIG. 5 demonstrates how the system determines whether a member or guest has arrived at their authorized location after being granted access into the controlled access area as described in FIG. 3.

At step F5*a*, physical wireless radio, sound and/or light-based beacons are placed throughout a controlled access area to determine specific locations within the access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and transmitted by the wireless radio, sound and/or light-based beacons to the access control & location tracking system preferably in continuous intervals.

At step F5*b*, the access control & location tracking system receives the access key(s) as well as location of the device based on which wireless radio, sound and/or light-based beacons received the key and compares the key(s)/location to the access control & location tracking database.

At step F5c, if the access control & location tracking system determines that the location of the member or guest is at the final authorized location based on the permissions retrieved in F5b, then the system will update the database.

At step F5d, if the access control & location tracking system determines that the location of the member or guest is not at the final authorized location within the time allotted based on the permissions retrieved in F5b, then the system administrator and/or security staff is notified. In the case of a guest, the member who granted the guest access can be notified as well that the guest has not arrived at their authorized location within the time period allotted. The alert is generated by the access control & location tracking system and can be sent through computer, voice, email, IM, SMS, MMS, pager or other communication method. The access control & location tracking database is also updated with the member or guests current location.

FIG. 6 demonstrates how the system provides navigational assistance to members and/or guests after being granted access into the controlled access area as described in FIG. 3.

At step F6a, physical wireless radio, sound and/or light-based beacons are placed throughout a controlled access area to determine specific locations within the access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and then transmitted by the wireless radio, sound and/or light-based beacons to the access control & location tracking system in preferably continuous intervals.

At step F6b, the access control & location tracking system receives the access key(s) as well as location of the device based on which wireless radio, sound and/or light-based beacons received the key and compares the key(s)/location to the access control & location tracking database.

At step F6c, if the access control & location tracking system determines that the location of the member or guest is at the final authorized location based on the permissions retrieved in F6b, then the system will update the database.

At step F6d, if the access control & location tracking system determines that the location of the member or guest is not at the final authorized location based on the permissions retrieved in F5b, then it updates the access control & location tracking database with the member or guests current location. The system then calculates the possible routes to the final authorized location from the current location of the member or guest. The route information is electronically sent to the member or guests device through computer, voice, email, IM, SMS, MMS, pager or other communication method. Visual interpretation and presentation of the route may also be provided, such as, but not limited to through the electronic device's screen or display. Additionally, the termination or suspension of all or some of the guest/member's access permissions as described above can also be performed by the Access Control & Location Tracking system where the guest/member does not reach a specific location in the allotted or predetermined amount of time.

FIG. 7 demonstrates how a member or system administrator can create a new digital key and assign the specific permissions and notifications for the new digital key. This process can also be utilized to edit permissions and notifications for existing keys.

At step F7a, the "Create New Key" function is selected within the access control & location tracking system by a user with key creation privileges such as a system administrator or member. Preferably, the system administrator or member will have previously signed on or logged in to the system so that their key creation privileges are recognized by the system. Guests are preferably not allowed to create new keys, though such is not considered limiting, and the system can be programmed where a guest could create a key or transfer his or her key to another keychain in certain or limited situations (i.e. husband to wife or vice versa, etc.).

At step F7b, the access control & location tracking system electronically queries the system database to determine existing key recipients as well as available locations, access points, and the rule set assigned to the system administrator or member creating the new key. The user can only create new keys that they themselves have been granted permissions for. As a non-limiting example, if a given user is not allowed access to a specific location, said user would not be able to create a key granting access to that specific location. The screens and options available for creating a key in F7c through F7l are customized based on the granted permissions for the user creating the key. Therefore, another user who has more permissions than the user presented with the options in F7c through F7l could be presented with additional options and screens not shown in F7c through F7l. Similarly, another user who has less permissions may be presented with less than all of the options and screens shown in F7c through F7l. Additionally, the system can be programmed such that the options specified in F7c through F7l work in conjunction with each other, so for example, if a single date is specified along with a specific time span, the key can only be valid for that time span on the specified date.

At step F7c, the user enters or selects the recipient's name and contact information from the list of available recipients retrieved in F7b. The specific data elements entered will depend on the electronic method desired to send the digital key to the recipient. For example if email delivery is selected, then a name and email address is required for the recipient but if an SMS or voice call is selected, a name and phone number for the recipient is required.

At step F7d, the user selects the type of key recipient for this new key. Keys can be created for Members, Guests, Administrators and/or Public Service personnel such as Police, Fire, Utility and Government Agency workers, though such is not considered limiting, and other types of individuals based on status, employment, etc. can also be digital key recipients.

At step F7e, the user specifies the number of times this digital key can be used. Keys can be created for one-time use only, for a specific number of times or for an unlimited number of times.

At step F7f, the user specifies the permissible access dates for the digital key. Keys can be created for a single time span, multiple time spans, or without a time restriction.

At step F7g, the user specifies the permissible access times of day/night for the digital key. Keys can be created for a single time span, multiple time spans, or without a time restriction.

At step F7h, the user specifies the permissible access locations and entry points for the digital key. Keys can be created for a single location/entry point, multiple locations/entry points, or all locations and entry points.

At step F7i, next the user can select if notifications are to be sent related to the usage of this digital key. This function would typically apply to keys generated for guests or public service personnel. If the user does not wish to configure any notifications related to the use of this key, the data and entries for the specific digital key created are saved in the electronic database and steps F7*j* through F7*m* are skipped. If they user wishes to create notifications related to the use of this key, then the user can preferably proceed to F7*j*.

At step F7*j*, the user selects the type(s) of notifications to be sent. As non-limiting examples, notifications can be sent based on the usage of the key to gain entry to a restricted location, upon arrival at a permitted location, when the key recipient does not arrive at a specific location or if the key recipient has navigated off course from the point of entry to the final authorized location.

At step F7*k*, the user selects the method(s) of notifications to be sent. Notifications can be sent via SMS/MMS, Email, Voice, or on-screen at the access control & location tracking system or directly through the access control & location tracking system software on the administrator or member's electronic computer system/device.

At step F7*l*, the user selects or enters the notification recipient(s). Notification recipient(s) can be selected from a list of existing administrators and members or entered with the recipient(s) name and contact information. For example if an email notification is selected, then a name and email address is preferably provided for the recipient but if an SMS or voice call is selected, a name and phone number for the recipient is preferably provided.

At step F7*m*, the digital key with all permission and notification settings is electronically saved in the system database.

At step F7*n*, the access control & location tracking system electronically delivers the newly created (or modified) key to the recipient according to the contact information obtained in F7*c*.

FIG. 8 demonstrates how a member, guest, system administrator or public service personnel can receive digital keys from multiple access control & location tracking systems and store those keys in an electronic keychain database on their electronic computer system or device. The multiple systems can be associated with multiple locations. In one non-limiting example, one location can be residential community 1, the next location condo building 2, the next location a commercial office building. In some instances, the beacons can be used in multiple systems (i.e. lobby of a commercial office building where multiple systems are installed in the building for different companies that have office space in the building, etc.)

At step F8*a*, one or more access control & location tracking systems generates digital key(s) for a member, guest, administrator or public service personnel as described above. The digital keys are electronically sent to a computer system or device belonging to the member, guest, administrator or public service personnel.

At step F8*b*, the digital keys sent to the member/guest's electronic computer system or device are electronically stored in the keychain database also stored on the device.

The system can operate similar for members as it does for guests, with the exception that a member can be permitted to create and provide electronic guest keys to others, granting no more than the member's own level of privileges and/or access. Guest can preferably only use the electronic key provided by a member or another authorized user of the system, but preferably cannot create electronic guest keys for other guests or permit another electronic device to use the electronic guest key they were provided with (i.e. cannot forward the electronic guest key to another guest). However, the system can also be programmed to permit a guest to transfer their electronic guest key to another authorized guest already listed in the system (i.e. husband to wife or vice versa, parent to child, etc.), such as where only one guest key is created.

FIG. 9 illustrates how a member or guest would manually choose a key from their device's keychain database to transmit to an access control & location tracking system.

At step F9*a*, the member or guest attempting to enter a controlled access location will have an electronic key(s) on their device, such as the electronic key(s) the guest receives from the steps described in FIG. 2. The electronic key(s) will be stored in the keychain database on the member's/guest's electronic device. The member or guest opens the Access Control & Location Tracking system application on their electronic device and selects the option to manually transmit a key. The application on the device queries the keychain database on said device to determine which keys are stored and available for transmission.

At step F9*b*, if no access key has been selected for transmission, the application on the member or guests electronic device will continue to wait for authorization to transmit a selected key.

At step F9*c*, f the member or guest selects a key and authorizes its transmission, the device will retrieve the selected electronic keys stored in the device's keychain database and transmit it to any wireless radio, sound and/or light-based beacons in an immediate proximity to the controlled access area entrance. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided to, downloaded or later acquired by the electronic device. The Access Control and Location Tracking system, through instructions provided by the programmed software, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F9*d*, the member or guest's transmitted key is received through wireless radio, sound and/or light-based beacons and sent to the access control and location tracking system.

At step F9*e*, the access control & location tracking system automatically searches though the access control & location tracking database for permissions granted to the member or guest from the provided key. The member or guest will be permitted to enter areas based on these permissions.

At step F9*f*, if a valid key is presented, an electronic notification can be sent back to the member or guest's electronic device through the wireless radio, sound and/or light-based beacon indicating the key was validated and used.

At step F9*g*, the application on the member or guest's electronic device updates the access control & location tracking keychain database indicating the usage of the key.

At step F9*h*, if a valid key is not presented, an electronic notification can be sent back to the member or guests' electronic device through the wireless radio, sound and/or light-based beacon indicating the key was not validated and asking the member or guest to select a new key to transmit.

At step F9*i*, the application on the member or guests' electronic device queries the access control & location tracking system keychain database for any other available keys and the process begins again at F9(*b*). If no other keys are available, the member or guest can then take steps to request a key as described in FIG. 1 or 12.

FIG. 10 illustrates how a member or guest would manually choose a key from their device's keychain database to transmit to an access control & location tracking system after prompting by a wireless radio, sound and/or light based beacon.

At step F10a, wireless radio, sound and/or light based beacon(s) transmit a signal that is received by the member or guests electronic device. The application installed and running on the member or guests' electronic device will receive the signal from the beacon(s) and prompt, preferably automatically, the member or guest that they are in the proximity of the beacon(s) and to select a key for transmission to the beacon(s).

At step F10b, the member or guest attempting to enter a controlled access location will have an electronic key(s) on their device, such as the electronic key(s) the guest receives from the steps described in FIG. 2. The electronic key(s) will be stored in the keychain database on the device. The member or guest opens the Access Control & Location Tracking system application on their electronic device and selects the option to manually transmit a key. The application on the device queries the keychain database on the device to determine which keys are stored and available for transmission.

At step F10c, if no access key has been selected for transmission, the application on the member or guests electronic device will continue to wait for authorization to transmit a selected key.

At step F10d, if the member or guest selects a key and authorizes its transmission, the device will retrieve the selected electronic keys stored in the device's keychain database and transmit it to any wireless radio, sound and/or light-based beacons in an immediate proximity to the controlled access area entrance. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software that can be similar to those instructions referenced for FIG. 9, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F10e, the member or guest's transmitted key is received through wireless radio, sound and/or light-based beacons and sent to the access control and location tracking system.

At step F10f, the access control & location tracking system automatically searches though the access control & location tracking database for permissions granted to the member or guest from the provided key. The member or guest will be permitted to enter areas based on these permissions.

At step F10g, if a valid key is presented, an electronic notification can be sent back to the member or guest's electronic device through the wireless radio, sound and/or light-based beacon indicating the key was validated and used.

At step F10h, the application on the member or guest's electronic device updates the access control & location tracking keychain database indicating the usage of the key.

At step F10i, if a valid key is not presented, an electronic notification can be sent back to the member or guests' electronic device through the wireless radio, sound and/or light-based beacon indicating the key was not validated and asking the member or guest to select a new key.

At step F10j, the application on the member or guests' electronic device queries the access control & location tracking system keychain database for any other available keys as in F10(b) and the process repeats from that point. If no other keys are available, the member or guest can then take steps to request a key as described in FIG. 1 or 12.

FIG. 11 illustrates how a key from a member or guests' electronic device keychain database is automatically transmitted to an access control & location tracking system after prompting by a wireless radio, sound and/or light based beacon.

At step F11a, wireless radio, sound and/or light based beacon(s) transmit a signal that is received by the member or guests electronic device. The application installed and running on the member or guests' electronic device will receive the signal from the beacon(s) and begin to search for a key to transmit. Each beacon in the system can send out a signal that the application on the electronic device can read. That signal can contain information such as, but not limited to, the name of the beacon, the organization it belongs to and location of the beacon. This same location information can be stored in the keys that are generated.

At step F11b, the member or guest attempting to enter a controlled access location will have an electronic key(s) on their device, such as the electronic key(s) the guest receives from the steps described in FIG. 2. The electronic key(s) will be stored in the keychain database on the device. The member or guest opens or has running, the Access Control & Location Tracking system application on their electronic device and said application is or has previously been configured to automatically transmit a key(s). The application on the device queries the keychain database on said device to determine which keys are stored and available for transmission.

At step F11c, if no access key exists in the database for this location, the member or guest is notified through the access control & location tracking application installed and running on their electronic device. The member or guest can then take steps to request a key as described in FIG. 1 or 12.

At step F11d, if the access control & location tracking system application on the member or guests' electronic device locates a key for the location, it will retrieve the selected electronic key stored in the device's keychain database and transmit it to any wireless radio, sound and/or light-based beacons in an immediate proximity to the controlled access area entrance. In one embodiment for locating the key, the software can compare the location and other information it received from the beacon to search the keychain database. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software that can be similar to the those instructions referenced for FIG. 9, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F11e, the member or guest's transmitted key is received through wireless radio, sound and/or light-based beacons and sent to the access control and location tracking system.

At step F11f, the access control & location tracking system automatically searches though the access control & location tracking database for permissions granted to the member or guest from the provided key. The member or guest will be permitted to enter areas based on these permissions.

At step F11g, if a valid key is presented, an electronic notification can be sent back to the member or guest's electronic device through the wireless radio, sound and/or light-based beacon indicating the key was validated and used.

At step F11h, the application on the member or guest's electronic device updates the access control & location tracking keychain database indicating the usage of the key.

At step F11i, if a valid key is not presented, an electronic notification can be sent back to the member or guests' electronic device through the wireless radio, sound and/or light-based beacon indicating the key was not validated and prompting the access control & location tracking system application to select a new key to transmit.

At step F11j, the application on the member or guests' electronic device queries the access control & location tracking system keychain database for any other available keys as in F11(b) and the process repeats from that point.

FIG. 12 shows one method for allowing a guest to request a key from a member.

At step F12a, a guest opens the access control & location tracking system application on their electronic device. Preferably the software app is previously downloaded electronic device and can be used at various different locations where the system is installed. Furthermore, if the person has used the app in the past for access, the app will already be on their electronic device for subsequent uses whether at the previous location or other locations where the system is installed. Through the application, the guest selects or enters the member information for which the guest would like to request a key from. The guest then selects a button to request a key and a key request is transmitted to the access control & location tracking system through any available form of electronic communication and data transfer including but not limited to through a wireless radio, sound or light enabled beacon, wired or wireless internet connection, voice call, SMS, Email or MMS. Furthermore, other non-limiting examples of ways a guest can request a key from a member include, but are not limited to, through a member name directory similar to a call box a community allows a person to scroll through the names of the residents and a method to contact them. The members' address, phone numbers, email addresses and other information does not need to be shown to the guests in order for the guests to use the system to facilitate communication. The system can also be configured so that the directory can be turned off if desired, or the directed limited to those who are at the same location as the guest. Also, the software can be provided with an address book functionality to store member and guests names for future use, which can be useful for a member who needs to frequently issues keys to the same person or a guest who frequently requests access from specific people.

At step F12b, the access control and location computer system records the guest's request and automatically enters it into the access control & location tracking system database. The Access Control & Location Tracking system also retrieves the member's information so that it may forward the request to the member's electronic device.

At step F12c, the Access Control & Location Tracking system transmits the guest key request to the member's electronic device through any available form of electronic communication and data transfer including but not limited to through a wireless radio, sound or light enabled beacon, wired or wireless internet connection, voice call, SMS, Email or MMS.

At step F12d, a member receives the guest key request and proceeds to enter any limitations to be placed on guest's access to the controlled area in the request. An administrator can also be permitted to enter additional access restrictions for the guest. In one non-limiting embodiment, the system can be programmed to provide a form containing a series of checkboxes for each location controlled by the system that the member can select from. A date and time module can also be provided for allowing the member to indicate the starting date and time and ending date and time for the guest's digital key. Further detail on the permissions and limitations a member can place on a key for a guest is discussed in FIG. 7.

At step F12e, the member transmits the newly created guest key from their electronic device to the Access Control & Location Tracking system through any available form of electronic communication and data transfer including but not limited to through a wireless radio, sound or light enabled beacon, wired or wireless internet connection, voice call, SMS, Email or MMS.

At step F12f, the Access Control & Location Tracking system receives the guest key and stores it in the Access Control & Location Tracking System Database.

At step F12g, the access control and location computer system can directly send the guest an electronic key to their smartphone or other electronic device via electronic communication methods including but not limited to direct data connection, SMS, Email, MMS and voice. A confirmation electronic message can be sent to the member to inform them that their guest's key was approved and sent to the guest. Alternatively, the system can be programmed that the guest key is first sent to the member, and the member forwards it to the guest. The key is imported to a software application, which can be the same software application referenced in Step 12(a), which is stored locally on the guest's device. This application acts as an electronic keychain of access keys. Once the guest receives the key, the guest has all access rights, which have been granted to them by a member, as seen in F2a, F12d and FIG. 7. The guest can have a key provided by multiple members within the same Access Control & Location Tracking System location or keys for multiple locations (with separate instances of the Access Control & Location Tracking System). As a non-limiting example, if the guest is a service provider (i.e. plumber, electrician, personal trainer, delivery person, etc.) the guest may need to have keys from multiple members at any given time. Also in some instances a person can be a member at one location and a guest at other locations and may have member key(s) and guest(s) keys on his or her electronic keychain database stored on his or her electronic device.

At step F12h, the electronic key is electronically stored in the access control & location tracking keychain database on the guest's device.

FIG. 13 demonstrates how the system determines presence at a location to determine the proper digital key to utilize at a specific location and time.

At step F13a, physical wireless radio, sound and/or light-based beacons are placed throughout a controlled access area to determine specific locations within the access area. These are arranged so that when a member or guest with a wireless radio, sound and/or light enabled device and the permissions application running on their device enters the area, they are preferably constantly within range of a beacon.

At step F13b, the member or guests wireless radio, sound and/or light enabled device queries the keychain database stored in their electronic device to determine what location the device is currently located at. This query is done based on the identification information received by the device from the beacon. Preferably, the beacon, at a minimum, transmits a unique identifier to the device. This allows for the beacon's specific location to be determined or known by the device such that the device determines the proper digital key to retrieve from the keychain database for the specific location. Preferably, the device will also learn or determine what the power and duration configuration settings are for the specific location from the signal transmitted by the beacon for the location and/or from information stored in the keychain database associated with the specific location.

At step F13c, the member or guests wireless radio, sound and/or light enabled device determines what the signal strength is from the received signal transmitted by the wireless radio, sound and/or light-based beacon(s). If the received signal strength, which can be measured in Decibels, Signal Strength Percentage or other non-limiting value, is not above the minimum specified or preprogrammed/preconfigured threshold for a given location as determined in F13b, the member or guests wireless radio, sound and/or light enabled device will continue to scan for signals or transmissions from the wireless radio, sound and/or light-based beacon(s) and will make similar signal strength determinations for subsequent signals/transmissions it receives. If the received signal strength is above the minimum threshold for a given location, the system continues to the next step.

At step F13d, the member or guests wireless radio, sound and/or light enabled device begins a timer to determine the length of time that a wireless radio, sound and/or light-based beacon's signal is received above the minimum signal strength threshold. If the received signal strength falls below the minimum threshold before the minimum duration has elapsed, the member or guests wireless radio, sound and/or light enabled device will continue to scan for signals or transmissions from the wireless radio, sound and/or light-based beacon(s) and will make similar signal strength and/or duration determinations for subsequent signals/transmissions it receives. If the received signal strength remains above the minimum threshold as determined in F13b, for longer than the minimum duration then the member or guests wireless radio, sound and/or light enabled device will transmit the key retrieved n F13b to the access control & location tracking system.

At step F13e, the access control & location tracking system will update the access control & location tracking database regarding valid and/or invalid signal determinations from steps 13c and/or 13d. It can then grant or deny access based upon the configured permissions for the particular member or guest.

Figure 14:
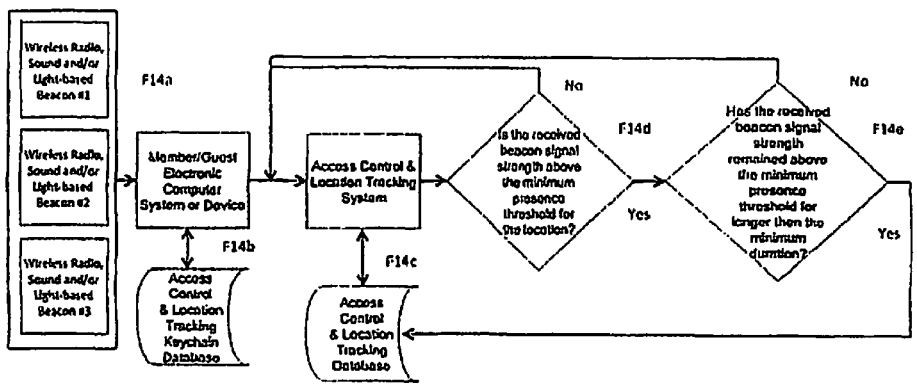
FIG. 14 is a block diagram of certain non-limiting components for determining presence at a specific location and also illustrating another embodiment of the steps/communications generally involved in selecting the appropriate digital key for the specific location.

FIG. 14 demonstrates another method for how the system determines presence at a location to determine the proper digital key to utilize at a specific location and time.

At step F14a, physical wireless radio, sound and/or light-based beacons are placed throughout a controlled access area to determine specific locations within the access area. These are arranged so that when a member or guest with a wireless radio, sound and/or light enabled device and the permissions application running on their device enters the area, they are preferably constantly within range of a beacon.

At step F14b, the member or guests wireless radio, sound and/or light enabled device queries the keychain database stored in their electronic device to determine what location the device is currently located at. This query is done based on the identification information received by the device from the beacon. Preferably, the beacon, at a minimum, transmits a unique identifier to the device. This allows for the beacon's specific location to be determined or known by the device such that the device determines the proper digital key to retrieve from the keychain database for the specific location. Preferably, the device will also learn or determine date and time information.

At step F14c, the member or guests wireless radio, sound and/or light enabled device transmits its identification, location and what the signal strength is from the signal/transmission it received from the wireless radio, sound and/or light-based beacon(s) to the Access Control & Location Tracking System.

At step F14d, The Access Control & Location Tracking System determines what the power and duration configuration settings are for the specific location.

At step F14e, the Access Control & Location Tracking System compares the configured settings retrieved in F14d to the received signal strength being reported by the member or guests wireless radio, sound and/or light enabled device. If the received signal strength, which can be measured in Decibels, Signal Strength Percentage or other non-limiting value, is not above the minimum specified threshold for a given location as determined above, the Access Control & Location Tracking System will continue to scan for signals or transmissions from the member or guests wireless radio, sound and/or light enabled device and will make similar signal strength determinations for subsequent signals/transmissions it receives. If the received signal strength is above the minimum threshold for a given location, the system continues to the next step.

At step F14f, the Access Control & Location Tracking System begins a timer to determine the length of time that a member or guests wireless radio, sound and/or light enabled device is transmitting a received signal strength from the wireless radio, sound and/or light-based beacon(s) above the minimum signal strength threshold. If the received signal strength falls below the minimum threshold before the minimum duration has elapsed, the Access Control & Location Tracking System will continue to scan for signals or transmissions from the member or guests wireless radio, sound and/or light enabled device and will make similar signal strength and/or duration determinations for subsequent signals/transmissions it receives. If the received signal strength is above the minimum threshold for a given location, the system will request that the digital key be sent by the member or guests wireless radio, sound and/or light enabled device to the access control & location tracking system.

At F14g, the member or guests wireless radio, sound and/or light enabled device transmits the digital key to the Access Control & Location Tracking System. It can then grant or deny access based upon the configured permissions for the particular member or guest. The access control & location tracking database can also be updated by the access control & location tracking system regarding valid and/or invalid signal determinations made by the access control & location tracking system The system that performs the above described functions and steps can include several components including, but not necessarily limited to:

1. One or more Wireless Radio, Sound and/or Light-based Beacon(s)
2. One or more member/guest electronic computer system or device(s)
3. Access Control & Location Tracking System
4. Access Control & Location Tracking System Database
5. Access Control & Location Tracking Keychain Database
6. A public or private computer network to connect or communicate the beacons and Access Control & Location tracking system and database with each other.

The various components can be in electrical and wireless communication with each other.

The ability to electronically monitor guest and member access to controlled areas will provide significant administrative and financial benefits incident to operators of controlled access locations. Without limitation, these include the following benefits:

1. Provide members with the ability to remotely allow guests entry, rather than necessitating the transfer of a physical object such as a keycard or conventional mechanical key.
2. Provide guests with real-time mapping and navigation in buildings and neighborhoods.
3. Allow members to confirm their guests have arrived and departed.
4. Reduce security costs by allowing increased automation of security systems.
5. Increase safety in controlled access locations by providing real-time data on the presence of unauthorized persons.
6. Provide public safety personnel with access to controlled locations in emergency or other necessary situations.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system and method has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An electronic method for granting access to an individual requiring access to a controlled access area with a closed entrance, said method comprising the steps of:
    a. electronically receiving one or more digital by a portable electronic device of a first party, each of said one or more digital keys providing access for the first party to an associated access point of a controlled access area;
    b. electronically storing the digital key to an electronic keychain database;
    c. electronically determining by the portable electronic device which digital key from one or more digital keys is needed by the first party for accessing to a specific access point of a controlled access area;
    d. wirelessly transmitting the digital key determined in step (c) by the portable electronic device for use by an access control computer system in order for granting of access by the access control computer system.

2. The electronic method for granting access of claim 1 wherein step (d) includes wirelessly transmitting the digital key by the portable electronic device to one or more beacons located in an immediate proximity to a closed entrance for the controlled access area for sending of the digital key by the one or more beacons to the access control computer system in order for granting of access by the access control computer system.

3. The electronic method for granting access of claim 1 wherein the electronic keychain database is contained within the portable electronic device.

4. The electronic method for granting access of claim 1 further comprising the step of electronically retrieving the determined digital key from the electronic keychain database by the portable electronic device prior to step (d).

5. The electronic method for granting access of claim 1 further comprising the step of confirming that the first party desires to use the determined digital key from the electronic keychain database by the portable electronic device.

6. The electronic method for granting access of claim 5 wherein the step of confirming comprising either receiving indication that a confirmation button was pressed by the first party or receiving a biometric identifier from the first party prior to step (d).

7. The electronic method for granting access of claim 1 further comprising the step of automatically determining or sensing which beacons are in proximity to the entrance for the controlled access area prior to step (c).

8. The electronic method for granting access of claim 1 further comprising the step of wirelessly receiving a signal by the portable electronic device from a beacon in range with the portable electronic device informing the portable electronic device to wirelessly transmit the digital key prior to step (c); wherein in step (c) the portable electronic device uses information from the received signal sent by the beacon to determine which digital key from the one or more digital keys to wirelessly transmit in step (d).

9. The electronic method for granting access of claim 2 wherein the digital key wirelessly transmitted to the one or more beacons in step (d) is electronically received by the access control computer system for processing and determining whether the first party has permission to access the controlled access area.

10. The electronic method for granting access of claim 1 further comprising the step of wirelessly transmitting the digital key determined in step (c) at continuous intervals after access permission has been granted by the access computer system and while the first party remains in the controlled access area in order to provide for real time information on access permissions granted including where an individual associated with the portable electronic device remain in the controlled access area after an authorized designated time period.

11. The electronic method for granting access of claim 1 further comprising the step of wirelessly transmitting the digital key determined in step (c) at continuous intervals after access permission has been granted by the access computer system and while the first party remains in the controlled access area for receipt by at least one beacon from a plurality of beacons positioned throughout the controlled access area in order to provide for real time information on access permissions granted including where an individual associated with the portable electronic device remain in the controlled access area after an authorized designated time period.

12. The electronic method for granting access of claim 11 further comprising the step of electronically receiving one or more possible routes information by the portable electronic device that are sent from the access control computer system to direct the first party to a final authorized location for the first party from a current location of the first party, wherein the one or more possible routes are determined by the access control computer system based on authorizations granted to the individual by the access control computer system.

13. The electronic method for granting access of claim 12, wherein the one or more possible routes information are calculated by the access control computer system after the access control computer system determines that the first party has not reached the final authorized location from information received from the at least one beacon.

14. The electronic method for granting access of claim 1 further comprising the step of electronically updating the electronic keychain database to indicate that the digital key was used to gain access to the controlled access area by the first party.

15. An electronic system for granting access to an individual requiring access to a controlled access area with a closed entrance, comprising:
  an access control computer specifically programmed to grant and deny access authorizations for one or more access points of a controlled access area for a location;
  a software application running on a portable electronic device for receiving one or more digital keys and determining which specific digital key to select from the one or more digital keys, each of the digital keys providing access for a first party to an associated access point of a controlled access area;
  an electronic database; wherein the one or more digital keys are stored in the electronic database;
  wherein the access control computer uses information for the selected digital key in deciding to grant or deny access authorizations.

16. The electronic system for granting access of claim 15 wherein the electronic database is an electronic keychain database which is contained within the portable electronic device.

17. The electronic system for granting access of claim 15 further comprising one or more beacons located in an immediate proximity to a closed entrance for the controlled access area, each of the one or more beacons programmed to transmit any received digital key to the access control computer system for use by the access control computer in granting of access by the access control computer system.

18. The electronic system for granting access of claim 15 wherein the software application retrieves the determined digital key from the electronic database.

19. The electronic system for granting access of claim 16 wherein the software application retrieves the determined digital key from the electronic keychain database.

20. The electronic system for granting access of claim 17 wherein the software application automatically determines or senses which beacons are in proximity to the entrance for the controlled access area as part of the digital key selection.

21. An electronic method for granting access to an individual requiring access to a controlled access area with a closed entrance, said method comprising the steps of:
  a. electronically determining by a portable electronic device which digital key from one or more digital keys is needed by a first party for the first party to access to a specific access point of a controlled access area; and
  b. wirelessly transmitting the digital key determined in step (a) by the portable electronic device for use by an access control computer system in order for granting of access by the access control computer system.

22. An electronic system for granting access to an individual requiring access to a controlled access area with a closed entrance, comprising:
  an access control computer specifically programmed to grant and deny access authorizations for one or more access points of a controlled access area for a location, and
  a software application adapted to run a portable electronic device of a first party and capable of determining which specific digital key to select from one or more digital keys for use to by the access control computer in determining whether to grant or deny access to the first party.

23. An electronic method for granting access to an individual requiring access to a controlled access area with a closed entrance, said method comprising the steps of:
  a. electronically retrieving one or more digital keys from one or more digital keys stored in an electronic keychain database of a portable electronic device of a first party wishing to grant access to a second party;
  b. electronically transmitting duplicate digital keys of the retrieved one or more digital keys to an access control computer system; and
  c. electronically transmitting by the access control computer system the duplicate digital keys to the portable electronic device of a second party, each of the duplicate digital keys received by the portable electronic device providing access for the second party to an associated access point of a controlled access area.

24. The electronic method for granting access of claim 23 further comprising the steps of electronically selecting a second party to receive the one or more duplicative digital keys and forwarding information regarding the selected second party to the access control computer system prior to step (c).

25. The electronic method for granting access of claim 23 further comprising the step of electronically configuring a number of times the duplicate key is valid for use by the second party prior to step (c).

26. The electronic method for granting access of claim 23 further comprising the step of electronically configuring one or more dates the duplicate key is valid for use by the second party prior to step (c).

27. The electronic method for granting access of claim 23 further comprising the step of electronically configuring one or more time ranges the duplicate key is valid for use by the second party prior to step (c).

28. The electronic method for granting access of claim 23 further comprising the step of electronically configuring one or more specific access points of a controlled access area the duplicate digital key is valid for use by the second party prior to step (c).

29. The electronic method for granting access of claim 23 further comprising the step of electronically configuring one or more notification settings for when the duplicate digital key is used by the second party prior to step (c).

* * * * *